No. 620,593. Patented Mar. 7, 1899.
R. KENNEDY.
ELECTRICAL STORAGE BATTERY AND PLATE THEREFOR.
(Application filed Sept. 9, 1897.)
(No Model.)
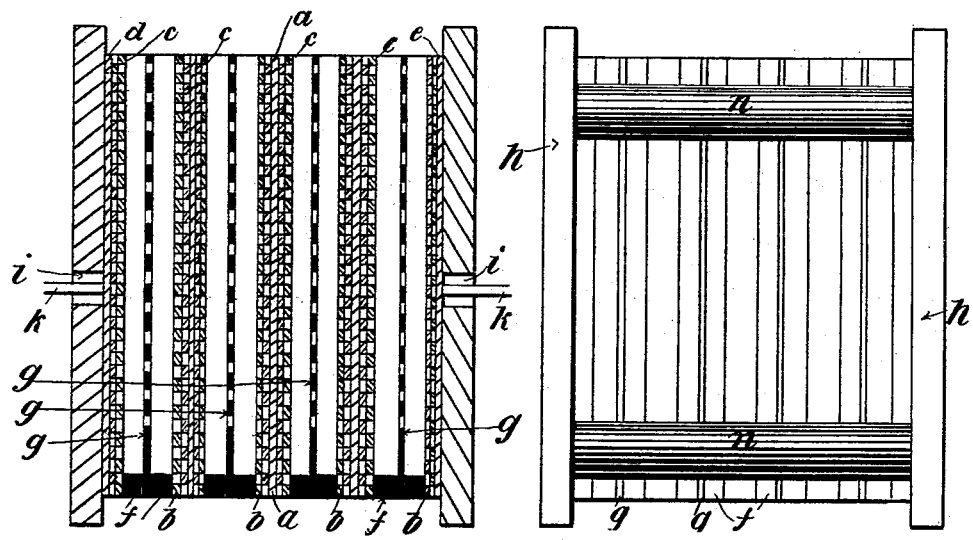
Fig. 2. Fig. 3.
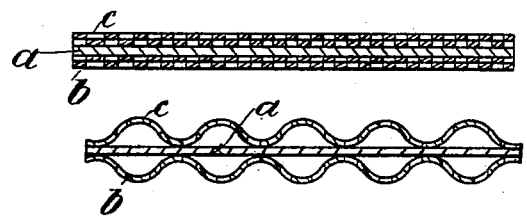
Fig. 1.
Fig. 5.
Fig. 4.
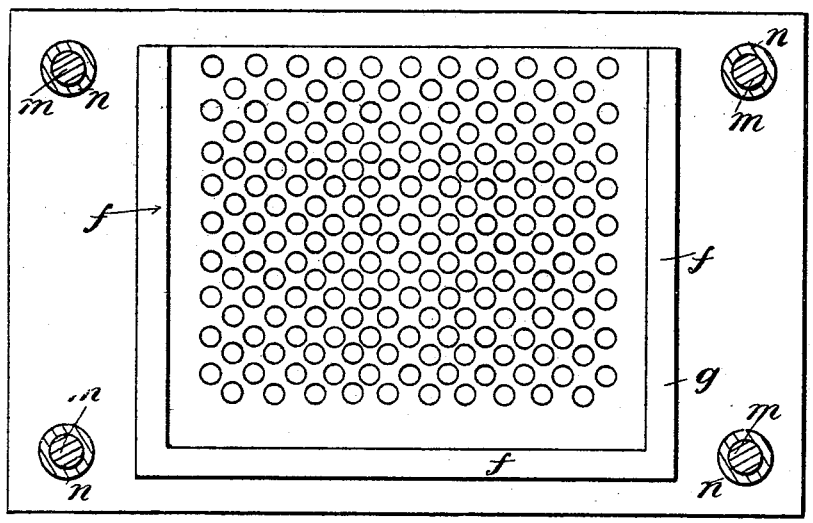
Witnesses
P. A. Preston
B. A. Fowks
Inventor
Rankin Kennedy
per T. E. Halford
atty

UNITED STATES PATENT OFFICE.

RANKIN KENNEDY, OF BRADFORD, ENGLAND.

ELECTRICAL STORAGE BATTERY AND PLATE THEREFOR.

SPECIFICATION forming part of Letters Patent No. 620,593, dated March 7, 1899.

Application filed September 9, 1897. Serial No. 651,122. (No model.)

*To all whom it may concern:*

Be it known that I, RANKIN KENNEDY, a subject of the Queen of Great Britain, residing at 33 Gladstone street, Bradford, in the county of York, England, have invented new and useful Improvements in and Connected with Electrical Storage Batteries and Plates Therefor, of which the following is a specification.

The object of this invention is to obtain the maximum of storage capacity and durability with the minimum of weight, thus making my improved plates and batteries specially suitable for traction purposes. I attain this object by the battery and plates illustrated in the accompanying drawings, in which—

Figure 1 represents a section of a battery-plate constructed according to this invention. Fig. 2 is a cross-section of a battery constructed according to this invention. Fig. 3 is an end view of same. Fig. 4 is a longitudinal section of same showing rubber washers and diaphragm. Fig. 5 shows a modified form of plate.

The same letters denote the same parts in all the figures.

Now according to this invention I make my improved plates of one solid sheet of lead $a$, having two or more thicknesses or layers of perforated sheet lead $b$ $c$, covered with red lead and litharge on each side thereof, $b$ being the litharge-covered perforated sheets and $c$ the red-lead-covered perforated sheets.

The plates are prepared as follows: After being cut to a uniform size the solid and perforated lead sheets are flattened and soaked in a hot solution of nitric acid and water of five per cent. strength, then washed in clean water, and the solid central sheet painted (while still wet) on one side with a paint composed of red lead and dilute sulfuric acid of a strength equal to 13° on Baumé's hydrometer. The other side of the sheet is painted with a paint composed of litharge and dilute sulfuric acid of a strength equal to 24° Baumé. The sheet is then allowed to dry slowly. The perforated sheets are while still wet coated with the red lead and litharge paints on both sides, care being taken not to fill up the perforations. Half the quantity of the perforated sheets are painted with litharge and the remainder with red lead. The sheets are allowed to dry slowly. By coating the sheets as hereinbefore specified by painting litharge and red lead onto chemically-clean surfaces the coating combines with the lead sheet and remains firmly attached thereto.

To form a complete plate, I take a central lead sheet coated as hereinbefore specified and place on each side of it one, two, three, or more (according to the required capacity of the plate) of the coated perforated sheets, all the red-lead-coated sheets being placed on the red-lead-covered side of the central sheet and all the litharge-covered sheets on the other side thereof. The whole are then riveted, fused, or soldered together to insure electrical contact. The complete plate is then made solid all around the edges by fusing or soldering, so that no liquid can escape from the plate. The lead sheets used to form the plates are about No. 24 Birmingham wire-gage, and the completed plate is made up of a sufficient number of perforated sheets to bring the thickness of the complete plate to about half an inch. The perforations should be from one-sixteenth to one-eighth of an inch in diameter.

To form a battery, I take of the plates prepared as hereinbefore specified as many as are required and two extra plates $d$ $e$, formed as hereinbefore specified, with this exception, that the solid sheet $a$ is only painted on the one side, one sheet being painted with red lead and the other with litharge, and the perforated sheets are only placed on the painted side of the solid sheet, one complete plate being + and the other —, the uncoated sides of the plates forming the + and — terminals of the battery, respectively. The plates are then built up in pile form, rubber washers $f$ $f$ being placed between each plate to form a cell for the electrolyte, each cell having a partially-perforated diaphragm $g$ therein. I take also two pieces of wooden board, vulcanite, or other non-conducting material $h$ $h$ slightly larger than the lead plates and bore a hole $i$ through each. I then solder or otherwise electrically connect a wire or metal strip $k$ to the outside of each of the terminal plates, which strip after being passed through the holes in the non-conducting supports $h$ $h$ is connected to binding-screws $l$, attached thereto. These insulating-supports are then bolted or screwed together by bolts or screws *m*, distance-pieces *n* being used to prevent the plates from being crushed. The easiest way to build up the battery is to lay one of the boards or vulcanized plates *h* flat on a table or bench, with the binding-screw downward, and lay the terminal plate on it. I next place thereon an india-rubber washer *f* in the shape of three sides of a square or oblong, according to the shape of the plates, the said washers being the same size as the plates. I then place a celluloid or vulcanite perforated diaphragm *g* on the washer *f*. On the diaphragm *g* I place another washer *f* and then one of the battery-plates on the second washer. On this plate I next place a third washer and on that another diaphragm. A fourth washer is placed on the diaphragm, in the next plate on that, and so on until the other terminal plate is at the top of the pile uncoated side upward. The other wood or vulcanite support is placed on the terminal and the whole secured by means of bolts and nuts or screws *m*, passing through the non-conducting supports. When building up the battery, care must be taken that the plates are so arranged that all the litharge-covered sides face one way and the red-lead-covered plates the other way—that is to say, supposing the red-lead-covered terminal is at the bottom all the plates, as building goes on, must be placed red-lead side upward. The diaphragms *g* are not perforated all over, but only to within about half an inch of the bottom of the cell, thus forming a pocket on each side of the diaphragm to catch any scale or fragments that may drop off the plates and prevent them from short-circuiting the battery or cells. The electrolyte used is dilute sulfuric acid. Instead of flat perforated sheets I may use corrugated sheets on each side of the central sheet treated and prepared as hereinbefore specified, thereby obtaining greater surface and capacity. Such an arrangement is shown by Fig. 5.

I am aware that perforated metal plates and plates having sides of different potentials have been used prior to my invention. I do not therefore lay any claim to these; but, Having fully described my invention, what I claim, and desire to secure by Letters Patent, is—

1. In plates for electrical storage batteries the combination of a central solid lead sheet painted on one side with litharge and dilute sulfuric acid and on the other side with red lead and dilute sulfuric acid with one or more layers or thicknesses of perforated lead sheets also painted with the aforesaid mixtures of litharge and red lead and sulfuric acid on each side of the central sheet, the litharge-painted sheets being placed on the litharge-painted side of the central sheet and the red-lead-painted sheets on the other side thereof the whole being in electrical contact and made solid around the edges by fusing or soldering as hereinbefore specified and for the purposes stated.

2. In electrical storage batteries the combination of lead plates having sides of opposite polarity composed of a central solid lead sheet painted on one side with a mixture of litharge and dilute sulfuric acid and on the other side with a mixture of red lead and dilute sulfuric acid having one or more layers or thicknesses of perforated lead sheets also painted with the aforesaid mixtures of litharge and red lead and dilute sulfuric acid on each side of the central sheet, the litharge-painted sheets being placed on the litharge-painted side of the central sheet and the red-lead-painted sheets on the other side thereof the whole being in electrical contact and made solid around the edges by fusing or soldering with india-rubber washers *f*, perforated non-conducting diaphragms *g* and non-conducting wood or vulcanite plates *h* connected together by bolts or screws *m* all substantially as hereinbefore specified and for the purposes stated.

3. In electrical storage batteries the combination of lead plates having sides of opposite polarity composed of a central solid lead sheet painted on one side with a mixture of litharge and dilute sulfuric acid and on the other side with a mixture of red lead and dilute sulfuric acid and having one or more layers or thicknesses of perforated lead sheets also painted with the aforesaid mixtures of litharge and red lead and dilute sulfuric acid on each side of the central sheet, the litharge-painted sheets being placed on the litharge-painted side of the central sheet and the red-lead-painted sheets on the other side thereof the whole being in electrical contact and made solid around the edges by fusing or soldering, with perforated non-conducting diaphragms between each plate the said diaphragms having a solid margin at the bottom and sides thereof and being separated from the said plates by india-rubber washers all substantially as set forth and for the purposes stated.

4. In plates for electrical storage batteries the combination of a central solid lead sheet painted on one side with litharge and dilute sulfuric acid and on the other side with red lead and dilute sulfuric acid, with one or more layers or thicknesses of corrugated perforated lead sheets also painted with the aforesaid mixtures of litharge and red lead on each side of the central sheet the litharge-painted sheets being placed on one side of the central sheet and the red-lead-painted sheets on the other side thereof the whole being in electrical contact and made solid around the edges by fusing or soldering as hereinbefore specified.

RANKIN KENNEDY.

Witnesses:
C. H. HARBERD,
C. A. DRAKE.